(12) United States Patent
Graves et al.

(10) Patent No.: US 6,785,675 B1
(45) Date of Patent: Aug. 31, 2004

(54) AGGREGATION OF RESOURCE REQUESTS FROM MULTIPLE INDIVIDUAL REQUESTORS

(75) Inventors: John Graves, Excelsior, MN (US); Viktor Poteryakhin, Plymouth, MN (US)

(73) Assignee: Convey Development, Inc., Plymouth, MN (US)

( * ) Notice: Subject to any disclaimer, the term of this patent is extended or adjusted under 35 U.S.C. 154(b) by 330 days.

(21) Appl. No.: 09/711,236

(22) Filed: Nov. 13, 2000

(51) Int. Cl.$^7$ .............................................. G06F 17/30
(52) U.S. Cl. .................................. 707/4; 707/5; 707/10
(58) Field of Search ............................. 707/3, 4, 5, 2, 707/10

(56) References Cited

U.S. PATENT DOCUMENTS

| | | | | |
|---|---|---|---|---|
| 5,485,605 | A | * | 1/1996 | Johnson et al. ................. 707/4 |
| 5,956,488 | A | * | 9/1999 | Suzuki ......................... 709/219 |
| 6,178,362 | B1 | * | 1/2001 | Woolard et al. ............ 700/295 |
| 6,182,061 | B1 | * | 1/2001 | Matsuzawa et al. ........... 707/2 |
| 6,209,038 | B1 | * | 3/2001 | Bowen et al. ............... 709/238 |
| 6,321,274 | B1 | * | 11/2001 | Shakib et al. ............... 709/330 |
| 6,438,537 | B1 | * | 8/2002 | Netz et al. ..................... 707/3 |
| 6,463,454 | B1 | * | 10/2002 | Lumelsky et al. .......... 709/105 |
| 2001/0049727 | A1 | * | 12/2001 | Mukherjee et al. ......... 709/219 |
| 2002/0016924 | A1 | * | 2/2002 | Shah et al. .................. 713/200 |
| 2002/0099692 | A1 | * | 7/2002 | Shah et al. ..................... 707/2 |

OTHER PUBLICATIONS

Shneiderman, Ben, "Batched Searching of Sequential and Tree Structured Files", ACM Transactions on Database System, vol. 1, Issue 3, Sep. 1976, pp. 268–275.*
Sellis, Timos, "Global Query Optimization", Proceeding of the 1986 ACM SIGMOD, 1986, pp. 191–205.*
Chen et al., "NiagaraCQ: a Scalable Continuous Query System for Internet Database", Proceedings of the 2000 SIGMOD International Conference. May 2000, pp. 379–390.*
Manegold et al., "A Multi–query Optimizer for Monet", National research institute for Mathematics and Computer science, Amsterdam, Netherlands, Jan. 31, 2000, 13 pages.*

* cited by examiner

Primary Examiner—Jean R. Homere
Assistant Examiner—Khanh Pham
(74) Attorney, Agent, or Firm—Schwegman, Lundberg, Woessner & Kluth, P.A.

(57) ABSTRACT

Independent and individual requests are aggregated and presented as a single request to a resource management system. The response from the resource management system is subsequently resolved back to the individual requests. The requesters generate multiple independent requests. The server receives such requests and sorts them into classes of requests, which are capable of being aggregated and processed as a single request by a resource management system. Parameters are pulled from the individual requests and used in the aggregated request.

17 Claims, 3 Drawing Sheets

AGGREGATION OF RESOURCE REQUESTS FROM MULTIPLE INDIVIDUAL REQUESTORS

FIELD OF THE INVENTION

The present invention relates to computer systems, and in particular to requests for resources managed by a computer system.

BACKGROUND OF THE INVENTION

Computer systems are used to execute software applications, such as relational databases. A relational database is a large collection of tables of data which users desire to access. A relational database manager is an application that is used to access that data. There are an incredible number of other applications, many of which provide information from a central computer or server to users working on client computers attached to the server. These applications may generically be referred to as resource management systems.

The client computers generate requests for the information from the server. Each such request is communicated to the server, the server processes each individual request, and then hopefully returns the information requested. There is a significant amount of processing or overhead associated with individual requests for information. The communication of each request has associated processing overhead, as well as the processing involved in actually retrieving the information. If there are a large number of independent and individual requests, the resource management system can become a bottleneck, bogged down by the overhead associated with the individual requests.

In relational database applications, the server runs a database management system. The requests are in the form of queries, such as structured query language (SQL) queries that identify the desired information. To process an SQL query, the database management system parses the query, and runs it through an optimizer in order to determine the most efficient manner in which to execute the query and return the results of the query. This is done for each individual query.

Some relational database management systems allow the sending of multiple updates, inserts and deletes at the same time, thus saving some of the overhead required when processing individual requests or queries. These are generated from a single source, and are not independent.

There is a need to reduce the number of individual requests from independent sources. There is a need to reduce the performance bottleneck associated with such individual requests at the resource management system. There is yet a further need to do so in a manner that is independent of the resource management system.

SUMMARY OF THE INVENTION

Independent and individual requests are aggregated and presented as a single request to a resource management system. The response from the resource management system is subsequently resolved back to the individual requests.

In one embodiment, multiple independent requestors, such as web browsers or credit card authorization devices are coupled to a server by a network. The network may be the Internet, Ethernet or other type of communication medium, including wireless. The requestors generate multiple independent requests. The server receives such requests and sorts them into classes of requests, which are capable of being aggregated and processed as a single request by a resource management system. Parameters are identified from the individual requests and used in the aggregated request.

In a further embodiment, the resource management system receives an aggregated request and accesses the resource, such as a database management system. In such a system, the request may be a parameterized query for information from one or more tables in a database. The database management system returns a set of rows, and the server matches each row of the set with the individual request, and provides the appropriate information back to the individual requestors.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section provides an overview of the invention at a high level. This is followed by a description of components used to implement the invention in one embodiment. Further detail regarding the function of the components is then described. This is followed by a conclusion that describes some potential benefits of the invention.

Figure 1:
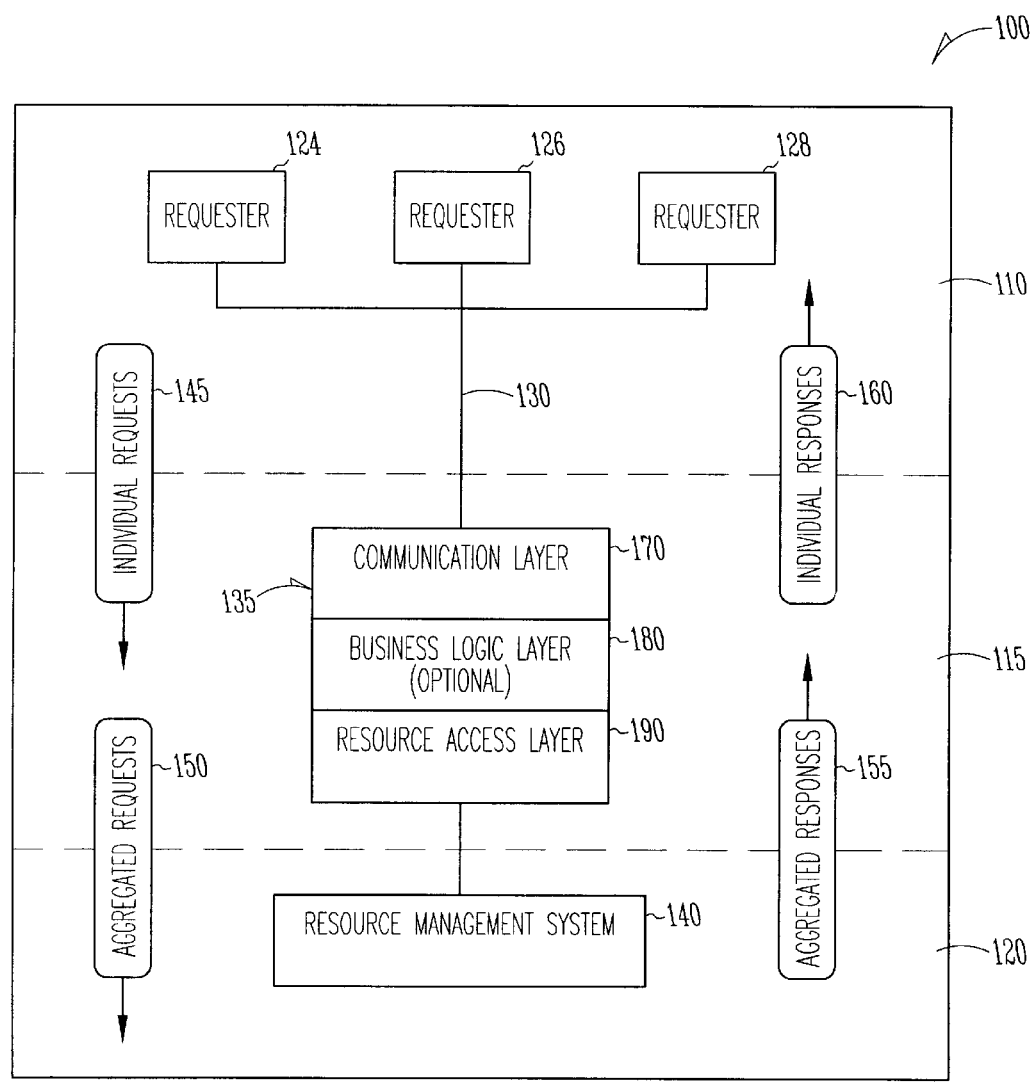
FIG. 1 is a block diagram of a system incorporating the resource request aggregator of the present invention.

A block diagram in FIG. 1 shows a system generally at 100 that includes the present invention, and generally requesters 110, a server 115 and a resource 120. At 110, a plurality of independent requesters or clients 124, 126 and 128 are shown. The requesters may be individual personal computers, virtual machines, credit card authentication devices or other type of machine or software that can generate individual and independent requests. Such requests are individual and independent in that they may or may not be related to one another, but all are not related to a single transaction and formed by an individual requester.

The requesters are coupled via a network connection 130, such as the Internet, Ethernet, Bluetooth™ (a registered trademarke of Bluetooth SIG, Inc.), or other type of communication medium suitable for communication, to an aggregator 135 in the server 115. The aggregator 135 is coupled to a resource management system 140 that is a part of resource 120. Resource 120, in one embodiment is a database management system, which is used to query and manage other transactions involving a database. It should be noted that the resource 120 may also comprise many different types of applications that receive requests, such as check clearing houses, credit card transaction processing systems, banking systems and others as will be apparent upon reading the detailed description. The requests may be requests for information, such as query requests, or may be requesting an action, such as inserts and updates, or actions with respect to other applications.

The aggregator 135 comprises a communication layer 170 which handles interprocess communication between the requesters and the server, essentially extracting and encoding requests for transmission. An optional business logic layer 180 receives requests processed by the communication layer 170 and may perform conversions of data types, and identify and/or enforce constraints. It may implement other types of functions such as caching and billing. A resource access layer 190 receives requests and responses. It is responsible for aggregation of requests and matching of responses back to the requests.

Figure 2:
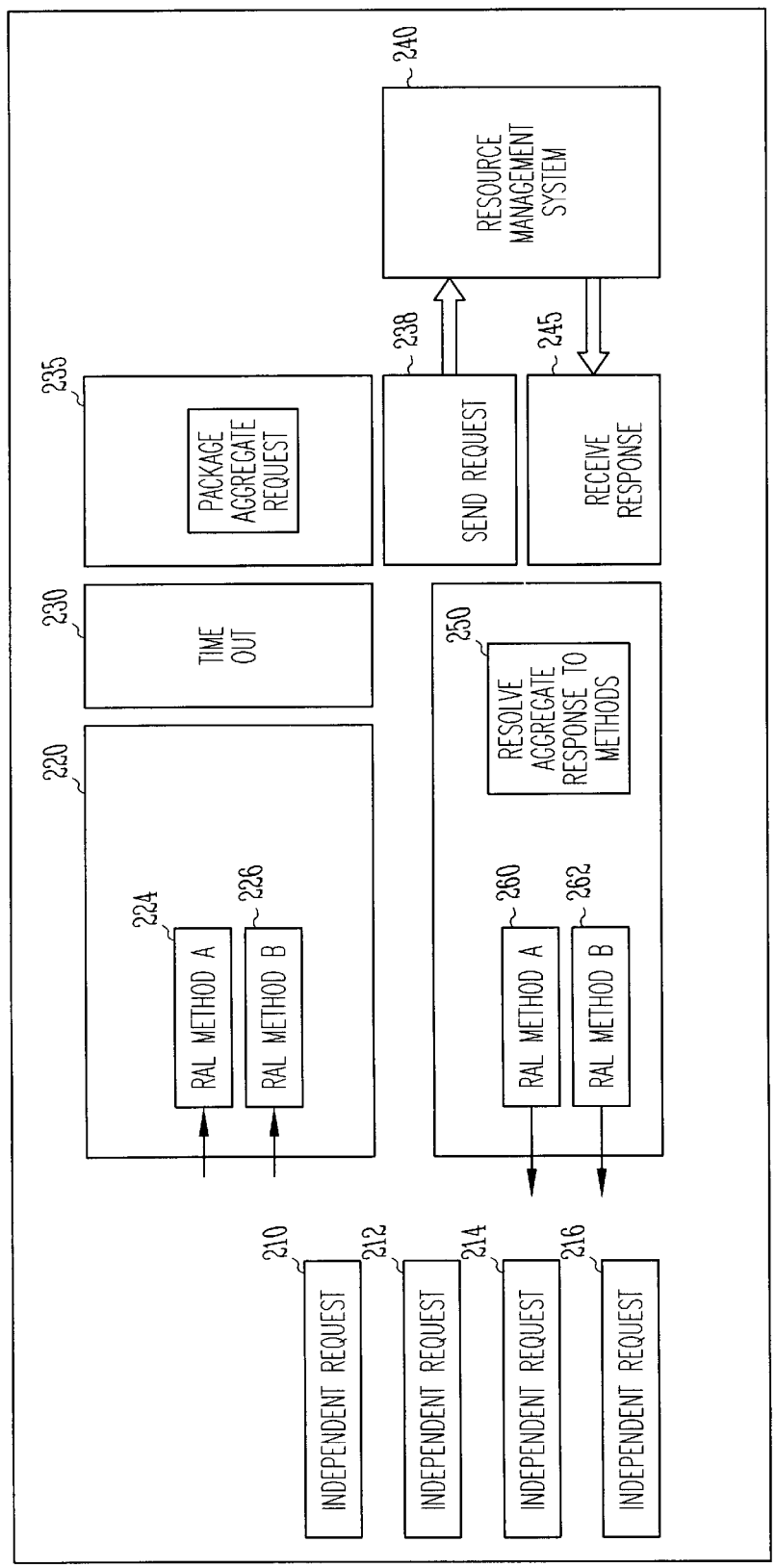
FIG. 2 is a block diagram of functional elements of the system of FIG. 1.

In the block diagram of FIG. 2, functions performed by the resource access layer 190 are shown in further detail. Incoming requests 210, 212, 214 and 216 are mapped to a group of methods 220 of the resource access layer. Each method A 224 and method B 226 correspond to a particular class of requests. In one embodiment, a class may be a query based on account name. Other classes may correspond to particular actions to take with respect to a class of devices. In general, a class is a set of requests that can be converted into an aggregate request that resource 120 can handle.

Methods can be executed asynchronously, with caller placing call and providing callback entry for completion notification. The method has arguments that comprise request parameters, such as account number in an example below, and an output parameter, such as balance in an account.

Execution of a method is pended until a specified time lapses or a specified number of calls are pending as indicated at threshold 230. As indicated, threshold 230 may be a time period, specified number of calls, and may also be a combination of both, such that if a specified number of calls are not received within a determined time, the method is executed anyway at the end of the time. There may be an independent threshold for each method, or the threshold may be the same for each method, or class of requests. In one embodiment, each method is monitored independently for meeting its threshold.

When the threshold is met the pending calls are sent for processing to the provider for this method. The provider packages arguments of the pending calls into an aggregated request at a provider 235, and sent at 238 to a resource management system 240 in the format required. Each type of resource management system may have its own custom provider 235 based on the different aggregated requests the system can handle. The provider 235 then sends the aggregated request to the resource management system.

The resource management system 240 then processes the aggregated request in a known manner and provides a response back to the resource access layer at 245. The aggregated response is resolved back to the pending calls and the output parameter at 250. Corresponding methods 260 and 262 are used to complete the calls using callback notification entries.

The resource management system 240 supports aggregated requests, and the aggregated requests are designed to provide data in the aggregated response that can be matched to the pending call arguments.

It should be noted that software may be implemented in modules which include a wide variety of functions. The flowchart in FIG. 3 may be implemented in modules, objects, and other forms of programming code, such as subroutines, and stored on a computer readable medium such as magnetic disks, optical media and other forms of storage which can be read or perceived by a machine or computer. Further computer readable media includes signal carriers on which digital data may be carried between devices.

Figure 3:
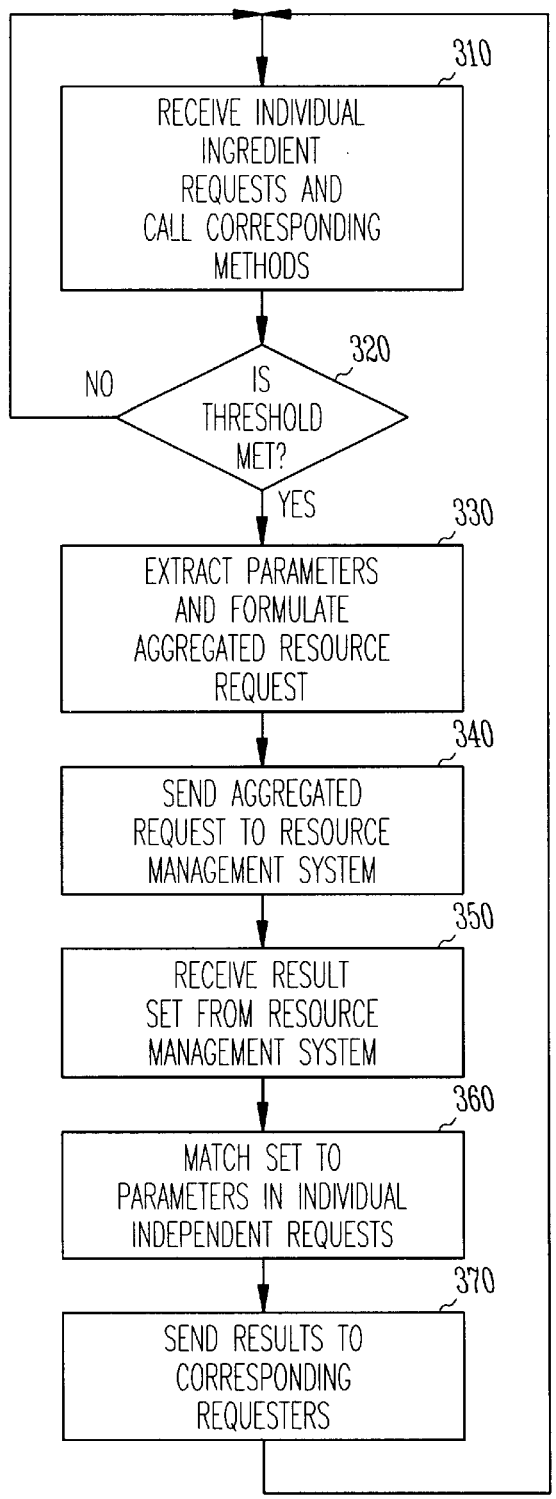
FIG. 3 is a flowchart of an example of the aggregation and processing of multiple requests.

The flowchart in FIG. 3 is discussed with reference to an example representative of a fictional bank with accounts stored in tables in a database. Overall, multiple requests for balances on different accounts are aggregated and sent to the database. A response is received and sent back to original requesters.

At 310, individual, independent requests are received.

Requester 1 sends request for balance on account 111

Requester 2 sends request for balance on account 222

Requester 3 sends request for balance on account 333

Each request results in a call of a method of the class corresponding to the request at 310. In the example, each request is of the same class.

Server receives request 1 and calls GetAccountBalance method with parameter 111

Server receives request 2 and calls GetAccountBalance method with parameter 222

Server receives request 3 and calls GetAccountBalance method with parameter 333

At 320, the threshold has been monitored as each request is received and method called. The threshold is three in this instance, and is met.

Pending calls are then scanned and an aggregated query is formulated at 330.

SELECT ACCOUNTNO, BALANCE FROM ACCOUNT MASTER

WHERE ACCOUNTNO=111 OR ACCOUNTNO=222 OR ACCOUNTNO=333

The aggregated query is then sent to database management system 340, and a result set, such as a table is received from the database management system at 350.

| ACCOUNT NO | BALANCE |
|---|---|
| 111 | $2000 |
| 222 | $3232 |
| 333 | $600 |

The result set rows are matched to pending call parameters at 360, and results are sent to corresponding requesters at 370.

Balance value of GetAccountBalance method with parameter 111 is set to $2000 and call-back is called Balance value of GetAccountBalance method with parameter 222 is set to $3232 and call-back is called Balance value of GetAccountBalance method with parameter 333 is set to $600 and call-back is called Server sends response of $2000 to requester 1

Server sends response of $3232 to requester 2

Server sends response of $600 to requester 3

In one embodiment, the returned table is simple scanned using the original query requests to match the request to the correct information in the table.

Conclusion

Access to resource management systems, such as database servers, is often a performance bottleneck. The invention aggregates individual and independent request for the resource, reducing the load on the resource management system, and improving overall system throughput. In clustered environments the resource access layer may reside on several computers that all access a single resource (database). Having multiple entities accessing the single resource can accentuate the performance bottleneck. The present invention may also improve performance in clustered environments.

In one embodiment of the present invention, the number of requests between the resource access layer and the resource is reduced. By reducing the number of requests, communication overhead and resource management system per request overhead is reduced.

This application is intended to cover any adaptations or variations of the present invention. It is manifestly intended that this invention be limited only by the claims and equivalents thereof. While some embodiments are described in terms of a database management system, it is recognized that resource requests in many other environments may be aggregated to improve performance.

What is claimed is:

1. A method of handling multiple requests for a resource management system, the method comprising:
   collecting independent requests for the resource management system from multiple individual requesters, wherein some of the independent requests require results that are different than results required by other independent requests;
   forming a single aggregated request from the collected requests;
   sending the aggregated request to the resource management system;
   receiving aggregated request results from the resource management system;
   matching the aggregated request results to the independent and individual requests; and
   sending corresponding independent request results to the individual requestors such that the single aggregated request satisfies all the collected requests in a single transaction with the resource management system.

2. The method of claim 1 wherein collecting independent requests occurs for a predetermined period of time prior to forming the single aggregated request.

3. The method of claim 2 wherein the predetermined period of time is modified to improve the speed with which results are received from the resource management system.

4. The method of claim 1 wherein collecting independent requests occurs until a predetermined number of requests have been collected.

5. The method of claim 4 wherein the number of requests is modified to improve the speed with which results are received from the resource management system.

6. The method of claim 1 wherein the requests are queries.

7. A computer readable medium having instructions to cause a computer to implement a method of handling multiple requests for a resource management system, the method comprising:
   collecting independent requests for the resource management system from multiple individual requestors, wherein some of the independent requests require results that are different than results required by other independent requests;
   forming a single aggregated request from the collected requests;
   sending the aggregated request to the resource management system;
   receiving aggregated request results from the resource management system;
   matching the aggregated request results to the independent and individual requests; and
   sending corresponding independent request results to the individual requestors such that the single aggregated request satisfies all the collected requests in a single transaction with the resource management system.

8. The computer readable medium of claim 7 wherein collecting independent requests occurs for a predetermined period of time prior to forming the single aggregated request, collecting independent requests occurs until a predetermined number of requests have been collected, or a combination thereof.

9. A server that handles multiple requests for a resource management system, the server comprising:
   a module that collects independent requests for the resource management system from multiple individual requestors, wherein some of the independent requests require results that are different than results required by other independent requests;
   a module that forms a single aggregated request from the collected requests such that the single aggregated request satisfies all the collected independent requests in a single transaction with the resource management system;
   a module that sends the aggregated request to the resource management system;
   a module that receives results from the resource management system;
   a module that matches the results to the independent and individual requests; and
   a module that sends corresponding results to the individual requesters.

10. A method of handling multiple requests for a resource management system, the method comprising:
    collecting independent requests for the resource management system from multiple individual requesters, wherein some of the independent requests require results that are different than results required by other independent requests;
    identifying requests from selected classes of requests;
    extracting data request parameters from the independent requests from a class; and
    forming a single aggregated request from requests in the class based on the parameters such that the single aggregated request satisfies all the collected requests in the class in a single transaction with the resource management system.

11. A computer readable medium having instructions for causing a computer to implement a method of handling multiple requests for a resource management system, the method comprising:
    collecting independent requests for the resource management system from multiple individual requestors, wherein some of the independent requests require results that are different than results required by other independent requests;
    identifying requests from selected classes of requests;
    extracting data request parameters from the independent requests from a class; and forming a single aggregated request from requests in the class based on the parameters such that the single aggregated request satisfies all the collected requests in the class in a single transaction with the resource management system.

12. A method of handling multiple queries for a database management system, the method comprising:
   collecting independent queries for the database management system from multiple individual users, wherein some of the independent queries require results that are different than results required by other independent requests;
   forming a single aggregated query from the collected queries;
   sending the aggregated query to the database management system;
   receiving a set of rows from the database management system;
   matching rows in the set of rows to the independent and individual queries; and
   sending information from the corresponding rows to the individual requestors responsive to the queries such that the single aggregated query satisfies all the collected queries in a single transaction with the database management system.

13. The method of claim 12 wherein forming an aggregated query comprises:
   identifying queries from selected classes of queries;
   extracting data request parameters from the independent queries from a class; and
   forming a single aggregated query from queries in the class based on the parameters.

14. The method of claim 13, wherein extracting data request parameters includes extracting a resource management system identifier and resource management system indexing parameters.

15. The method of claim 14, wherein the resource management system is a relational database management system (RDBMS) and the resource management system indexing parameters are structured query language (SQL) commands and identifiers.

16. A method of handling multiple queries for a database management system, the method comprising:
   collecting independent queries for a resource management system from multiple individual users, wherein some independent requests require results that are different than results required by other independent requests;
   identifying queries from selected classes of queries;
   extracting data request parameters from the independent queries from a class; and
   forming a single aggregated query from queries in the class based on the parameters such that the single aggregated query satisfies all the collected queries in the class in a single transaction with the database management system.

17. A method of handling multiple requests for a resource management system, the method comprising:
   collecting multiple independent requests for the resource management system from multiple individual requestors;
   extracting request parameters from the collected independent requests;
   enforcing one or more constraints on the extracted request parameters;
   returning constraint errors to the requestor;
   aggregating request parameters according to an extracted parameter classification;
   sending the aggregated request parameters to the resource management system;
   receiving results from the resource management system;
   matching the results to the independent and individual requests; and
   sending corresponding results to the individual requesters.

* * * * *

UNITED STATES PATENT AND TRADEMARK OFFICE
CERTIFICATE OF CORRECTION

PATENT NO. : 6,785,675 B1
DATED : August 31, 2004
INVENTOR(S) : Graves et al.

It is certified that error appears in the above-identified patent and that said Letters Patent is hereby corrected as shown below:

Title page,
Item [57], ABSTRACT,
Line 5, delete "requesters" and insert -- requestors --, therefor.

Column 3,
Line 9, below "applications." insert -- In operation, individual requests are represented at 145 as being generated by the requesters 110, aggregated by the server 115, and passed on to the resource 120 as aggregated requests 150. The resource management system 140 then processes each aggregated request and returns aggregated responses 155, which are separated by the server 115 back into individual requests 160 which are in turn provided back the corresponding requesters. --.

Column 4,
Line 37, delete "ACCOUNT MASTER" and insert -- ACCOUNT_MASTER --, therefor.

Column 5,
Lines 29 and 64, delete "requesters" and insert -- requestors --, therefor.

Column 6,
Lines 11, 39 and 43, delete "requesters" and insert -- requestors --, therefor.

Column 8,
Line 37, delete "requesters" and insert -- requestors --, therefor.

Signed and Sealed this

Twenty-sixth Day of October, 2004

JON W. DUDAS
*Director of the United States Patent and Trademark Office*